United States Patent Office 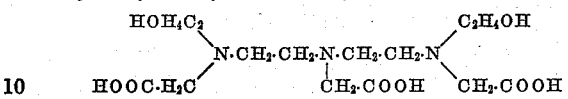

2,906,762
Patented Sept. 29, 1959

2,906,762

POLYHYDROXYETHYL POLYAMINE COMPOUND

Martin Knell and Harry Kroll, Warwick, R.I., assignors to Geigy Chemical Corporation, New York, N.Y., a corporation of Delaware No Drawing. Application August 13, 1954
Serial No. 449,771

10 Claims. (Cl. 260—439)

This invention is that of N,N″-dihydroxyethyl N,N′,N″-tricarboxymethyl diethylenetriamine, its preparation, its water-soluble salts with monovalent cations (e.g. monovalent metals such as the alkali metals, as well as radicals that act as monovalent cations, as the ammonium radical), and also its water-soluble chelates with divalent and higher than divalent metals. The invention includes the preparation of these salts, chelates, and also their aqueous solutions.

Very few sequestering agents investigated keep ferric iron in solution within the pH range of nine to twelve. For example, at pH 5 one mole of ethylenediamine tetraacetic acid (briefly designated EDTA), will sequester (and thereby hold in solution) approximately seven-tenths of a mole of ferric iron. However, on raising the basicity of the solution, the amount of iron held in solution decreases and is zero at pH 12. Similarly, while a mole of N,N′-dihydroxyethyl N,N′-dicarboxymethyl ethylenediamine holds one mole of ferric iron in solution at pH 5, at pH 9 it holds only half that in solution, and at one percent sodium hydroxide concentration the amount held in solution drops to seven one-hundredths of a mole.

In a study made in the project that produced this invention, diethylenetriamine pentaacetic acid (briefly called DETPA) showed favorable action in solubilizing ferric hydroxide. One mole of the sodium salt of DETPA held in solution approximately one mole of ferric iron. However, raising the alkalinity to pH 9 decreased the sequestering capacity to seven-tenths of a mole of ferric iron per mole of DETPA.

The N,N″-dihydroxyethyl N,N′,N″-tricarboxymethyl diethylenetriamine and its water-soluble salts with monovalent cations, of the invention, not only have just as effective sequestering capacity for ferric iron at about pH 5 as do the other products above described, but in contrast to them will retain such iron in solution in the same or even higher concentrations in the more alkaline ranges such as pH 9 to 14.

The products of the invention are illustrated by, but not restricted to, the following examples:

*N,N″ - dihydroxyethyl N,N′,N″ - tricarboxymethyl diethylenetriamine.*—In a round-bottomed, three-necked flask equipped with reflux condenser and bubbling tube, eighty-eight grams (2 moles) of ethylene oxide were bubbled into and absorbed by one hundred and three grams (1 mole) of diethylenetriamine at temperature ranging between about 30 to 150° C., due to the exothermic nature of the reaction. The resulting dark liquid reaction product analyzed correctly for dihydroxyethyl diethylenetriamine. Seventy-one grams of this reaction product were dissolved in one hundred grams of fifty percent sodium hydroxide and the solution heated to reflux. Eighty-nine grams of seventy percent glycolonitrile were added to the refluxing solution, dropwise over a period of three hours as fast as the released ammonia was liberated. Water then was added to the reaction mixture to maintain a uniform solution by keeping all solids in solution and to enable the solution to flow readily. The reaction mixture as thus dissolved in water gave a solution having about forty percent solids. These consisted essentially of the N,N″-dihydroxyethyl N,N′,N″-tricarboxymethyl diethylenetriamine, $$\begin{array}{c} HOH_4C_2 \diagdown \qquad \qquad \diagup C_2H_4OH \\ N\cdot CH_2\cdot CH_2\cdot N\cdot CH_2\cdot CH_2\cdot N \\ HOOC\cdot H_2C \diagup \quad \overset{|}{CH_2\cdot COOH} \quad \diagdown CH_2\cdot COOH \end{array}$$

as its trisodium salt, with the balance being a small percentage of free sodium hydroxide (the balance left as that portion of the hundred grams of fifty percent sodium hydroxide that did not react to form sodium carboxymethyl groups).

The corresponding tri-alkali metal salt, other than the above trisodium salt, of N,N″-dihydroxyethyl N,N′,N″-tricarboxymethyl diethylenetriamine, for example, the tripotassium salt, is prepared by replacing the one hundred grams of fifty percent sodium hydroxide used in the foregoing procedure by the stoichiometric equivalent of potassium hydroxide in the corresponding weight of its aqueous solution of similar concentration, and then completing the carboxymethylation with the glycolonitrile in the same way. Any other suitable concentration may be used.

The concentration of the N,N″ - dihydroxyethyl N,N′,N″-tricarboxymethyl diethylenetriamine (chelating agent) in any of the foregoing aqueous solutions of any of its tri-alkali metal salts is detemined by the amount of heavy metal ion, such as copper, which can be bound by the chelating agent. This value is obtained by adding an excess of insoluble copper phosphate to a known volume of solution containing the N,N″-dihydroxyethyl N,N′,N″-tricarboxymethyl diethylenetriamine and agitating the mixture until an equilibrium is attained. The slurry is centrifuged, and the aqueous supernatant layer is analyzed for copper chelated by the polyaminocarboxylic acid. Since one mole of copper combines with one mole of N,N″-dihydroxyethyl N,N′,N″-tricarboxymethyl diethylenetriamine, the chelated copper establishes the concentration of the polyaminocarboxylic acid in solution.

At the same time, the reaction just described with copper phosphate gave the copper chelate in aqueous solution in the supernatant liquid.

The corresponding iron (ferric as well as ferrous) chelates were made from the above described tri-alkali metal, such as the tri-sodium, salt aqueous solution by the same method described below after first determining the amount of iron the chelating agent could hold in solution at pH 9. The method developed for finding the ratio of ferric iron to chelating agent was as follows:

An aqueous solution of three milliliters of one-tenth molar ferric chloride and of one-tenth molar solution of the chelating agent was adjusted with aqueous sodium hydroxide solution to pH 9 and then diluted to one hundred milliliters. The resulting mixture was agitated for twenty-four hours. The supernatant liquid then was separated by filtration and analyzed for iron colorimetrically. With a molar ratio of one for the iron to the trisodium salt of N,N″-bis-hydroxyethyl N,N′,N″-tris(carboxymethyl)diethylenetriamine, one hundred grams of the chelating agent were found to bind (or sequester) fifteen grams of iron.

*The ferrous chelate.*—To an aqueous solution containing one hundred grams of the foregoing chelating agent there was admixed the quantity of an aqueous ferrous sulfate solution containing fifteen grams of iron, and thus yielded the ferrous chelate in solution, but containing the corresponding amount of sodium sulfate.

The solution of the sodium ferrous chelate of the polyaminocarboxylate can be spray dried thereby yielding that chelate in dry form as a brown powder.

*The ferric chelate* was prepared from the aqueous solution of the chelating agent by admixture with the required volume of an aqueous solution of ferric sulfate to provide the ratio of one hundred grams of the chelating agent to fifteen grams of iron, in the same manner as described with the use of ferrous sulfate for preparation of the ferrous chelate, in aqueous solution. The aqueous solution of the ferric chelate likewise was orange to dark red in color, contained thirty to forty percent of the chelate, and had a pH between 8 and 9. The ferric chelate can also be prepared in similar manner by admixing with the aqueous solution of chelating agent the corresponding amount of an aqueous solution of some other water-soluble ferric salt that does not destroy the chelating agent, such as ferric chloride or ferric nitrate. It can also be prepared by admixing the required amount of an aqueous suspension of ferric hydroxide. The ferric chelate can be had in dry form also by spray drying the aqueous solution of it.

*The chelating agent in free acid form.*—The aqueous solution obtained above of the tri-alkali metal salt, such as the trisoduim or tripotassium salt, of the chelating agent can be passed in convenient concentration through a column packed with the acid form of an anion exchange resin such as "Dowex–50" (available from the Dow Chemical Company, Midland, Michigan). The column can then be eluted with one-tenth molar ammonium hydroxide to yield an eluate containing N,N''-bis-hydroxyethyl N,N', N''-tris(carboxymethyl) ethylenetriamine. The aqueous eluate of this free acid can be evaporated to dryness to yield the compound in dry state.

While the trisodium or tri-potassium salts of this dihydroxyethyl tricarboxymethyl diethylenetramine are obtained by the method described above starting with diethylenetriamine, they and other water-soluble salts can be prepared by direct addition of the calculated theoretical amount of the particular alkali metal hydroxide or other necessary alkaline substance to the free acid, preferably in aqueous solution, and evaporating to dryness.

The water-soluble salts of N,N'-dihydroxyethyl N,N',N''-tricarboxymethyl diethylenetriamine embraced by the invention, and obtainable, for example, by the just described direct neutralization of one or more of its carboxyl groups are those of the monovalent metals as well as those formed with monovalent cationic radicals. Particularly included are its water-soluble salts with the "alkali-type" cations. Among these latter are its salts with an alkali metal as sodium, potassium, lithium, caesium, as well as those with the nitrogen-containing or ammonia-derived cations, for example, its ammonium salts and its salts with amines, such as with an alkanolamine as mono-, di-, or tri-ethanolamine or -propanolamine, or other such alkanolamine particularly lower alkanolamine, or with an alkylamine such as mono-, di-, or trimethylamine or -ethylamine, or other such lower alkylamine. As ammonium salts are so frequently grouped with the alkali metal salts, they likewise can be jointly considered here as illustrative of a monovalent alkali salt of the class consisting of the alkali metal and the ammonium salts.

A monovalently substituted salt is formed when the hydrogen of only one carboxyl group of this dihydroxyethyl tricarboxymethyl diethylenetriamine is replaced by a monovalent metal or other monovalent cation such as any of the ammonia-derived cations exemplified above. A divalently substituted salt results when the hydrogen of each of two of the carboxyl groups is thus replaced. Then a trivalently substituted salt results when the hydrogen of each of the three carboxyl groups similarly is replaced by one or another such monovalent metal or other monovalent cation.

The water-soluble chelate complexes of this dihydroxyethyl tricarboxymethyl diethylenetriamine, in addition to copper and iron already mentioned above, are those formed with any of other polyvalent metals. Thus, embraced among these chelate complexes of this sequestering agent are those of divalent metals such as the alkaline earth metals as barium, calcium, strontium, with magnesium included among them, and the iron group metals iron, nickel, and cobalt, and others such as copper, zinc, and manganese, as well as other divalent metals. The chelate complexes of higher than divalent metals are not only those with metals such as iron, cobalt, and manganese and others like them that also exist in the divalent state, but also those with metals that are only trivalent such as aluminum, as well as those of metals of any other valence. It is possible to have the chelate complex of any of the metals so long as it is divalent or higher.

In a chelate complex with a divalent metal, or the divalent state of a metal that has two or more valence states, the hydrogen of each of the carboxyl groups of this diethylenetriamine derivative is replaced by a valence bond of the divalent or higher valent metal. Thus, this dihydroxyethyl tricarboxymethyl diethylenetriamine also forms further complexes with the higher valence states of the various polyvalent metals having at least two valence states as well as with other higher than divalent metals.

N,N''-dihydroxyethyl N,N',N''-tricarboxymethyl diethylenetriamine can be used in aqueous solutions to prevent the precipitation of the hydroxides of di-, tri- and tetravalent metal ions, for it is an advantageously effective complexing agent for such metals as calcium, magnesium, copper, zinc, manganese, iron (especially ferric), nickel, and cobalt, and other metals, in such solutions. The salts of this dihydroxyethyl polyaminocarboxylic acid with the "alkali-type" cations, such as its alkali metal salts and ammonia-derived salts, are also useful as sequestering agents as well as for making chelate complexes with the various metal cations indicated. These chelate complexes with iron and the various other metals referred to above are water-soluble.

The iron chelate complex, particularly with ferric iron, is useful in agriculture, as in the treatment of trees suffering from iron chlorosis, for example, citrus trees growing in calcareous soils. As with the iron chelate complexes, others of the metal chelate complexes can likewise be incorporated in fertilizers to be applied to the soil, or dissolved in aqueous solution to be sprayed on the foilage or as a drench, similarly to overcome an unbalanced relative proportion to other metals of the respective one of the so-called minor metals that trees and plants derive from the soil.

This dihydroxyethyl tricarboxymethyl diethylenetriamine (in its free acid form), and in some instances its salts with the "alkali-type" cations, can be used in electroplating, and metal treating baths that contain metal ions that would precipitate under the operating conditions, to prevent the precipitation of such metals, for example, to prevent the precipitation of ferric iron.

While the invention has been described in relation to various specific embodiments of it, it is understood that many substitutions and other modifications can be made in it within the scope of the several appending claims that are intended also to cover equivalents as well.

What is claimed is:

1. A member of the class consisting of N,N''-dihydroxyethyl N,N',N''-tricarboxymethyl diethylenetriamine, its water-soluble salts with monovalent cations, and its water-soluble chelates with polyvalent metals.

2. A water-soluble metal chelate of N,N''-dihydroxyethyl N,N',N''-tricarboxymethyl diethylenetriamine.

3. A water-soluble metal chelate of N,N''-dihydroxyethyl N,N',N'' - tricarboxymethyl diethylenetriamine, wherein the metal is one of the iron group of metals.

4. A water-soluble metal chelate of N,N''-dihydroxyethyl N,N',N" - tricarboxymethyl diethylenetriamine, wherein the metal is iron.

5. The ferric chelate of N,N"-dihydroxethyl N,N',N"-tricarboxymethyl diethylenetriamine.

6. A water-soluble salt of N,N"-dihydroxyethyl N,N',N"-tricarboxymethyl diethylenetriamine with a monovalent cation.

7. An alkali metal salt of N,N"-dihydroxyethyl N,N',N"-tricarboxymethyl diethylenetriamine.

8. A sodium salt of N,N"-dihydroxyethyl N,N',N"-tricarboxymethyl diethylenetriamine.

9. A potassium salt of N,N"-dihydroxyethyl N,N',N"-tricarboxymethyl diethlenetriamine.

10. N,N" - dihydroxyethyl N,N',N"-tricarboxymethyl diethylenetriamine.

References Cited in the file of this patent
UNITED STATES PATENTS

| | | |
|---|---|---|
| 2,413,856 | Bersworth | Jan. 7, 1947 |
| 2,428,353 | Bersworth | Oct. 7, 1947 |
| 2,532,391 | Bersworth | Dec. 5, 1950 |
| 2,673,213 | Bersworth | Mar. 23, 1954 |
| 2,673,214 | Bersworth | Mar. 23, 1954 |

OTHER REFERENCES

Brintzinger et al.: Zeit. F. Anor. U. Allgem. Chem., 251 (1943), pages 285–294.

Chaberek et al.: Science, vol. 118, Sept. 4, 1953.

Bersworth Chemical Co. Adv. (V), Chem. and Eng. News 31 (Dec. 7, 1953), page 5141.

UNITED STATES PATENT OFFICE
CERTIFICATE OF CORRECTION

Patent No. 2,906,762                                          September 29, 1959

Martin Knell et al

It is hereby certified that error appears in the printed specification of the above numbered patent requiring correction and that the said Letters Patent should read as corrected below.

Column 3, line 43, for "N,N′-dihydroxyethyl" read -- N,N″-dihydroxyethyl

Signed and sealed this 12th day of April 1960.

(SEAL)
Attest:

KARL H. AXLINE                                                    ROBERT C. WATSON
Attesting Officer                                               Commissioner of Patents